(12) United States Patent
Jaber et al.

(10) Patent No.: US 8,219,792 B2
(45) Date of Patent: Jul. 10, 2012

(54) SYSTEM AND METHOD FOR SAFE INFORMATION HANDLING SYSTEM BOOT

(75) Inventors: Muhammed K. Jaber, Austin, TX (US); Jianwen Yin, Round Rock, TX (US); Jon R. Hass, Austin, TX (US); Kevin Marks, Round Rock, TX (US); Khachatur Papanyan, Austin, TX (US); Marshal F. Savage, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 395 days.

(21) Appl. No.: 12/574,249

(22) Filed: Oct. 6, 2009

(65) Prior Publication Data

US 2011/0083003 A1    Apr. 7, 2011

(51) Int. Cl.
*G06F 13/00* (2006.01)

(52) U.S. Cl. .................. 713/1; 713/2; 713/100

(58) Field of Classification Search .................. 713/1, 2, 713/100
See application file for complete search history.

(56) References Cited

U.S. PATENT DOCUMENTS

| | | |
|---|---|---|
| 7,113,594 B2 | 9/2006 | Boneh et al. |
| 2006/0026418 A1 * | 2/2006 | Bade et al. ............ 713/150 |
| 2009/0006859 A1 * | 1/2009 | Zimmer et al. ............ 713/186 |

* cited by examiner

*Primary Examiner* — M Elamin
(74) *Attorney, Agent, or Firm* — Hamilton & Terrile, LLP; Robert W. Holland

(57) ABSTRACT

Information handling system security is maintained by locking the information handling system from boot of an operating system with a service processor of the information handling system. The service processor obtains authorization for boot from a third party authentication service by providing authentication information to the authentication service and requiring a successful authentication for boot. For example, the service processor releases a token upon successful authentication to authorize boot. In one embodiment, the authentication service sends a token to the service processor for the service processor to use to authorize boot.

20 Claims, 2 Drawing Sheets

SYSTEM AND METHOD FOR SAFE INFORMATION HANDLING SYSTEM BOOT

BACKGROUND OF THE INVENTION

1. Field of the Invention

The present invention relates in general to the field of information handling system security, and more particularly to a system and method for safe information handling system boot.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increased use of information handling systems by enterprises and individuals has resulted in storage of large quantities of sensitive data and increased need for ready access to the data. Naturally, valuable data has garnered the interest of hackers and thieves who have sought to invade datacenters with attacks of increasing sophistication. In response, enterprises and individuals have employed a variety of authentication solutions to limit access to data and to protect networks and information handling systems from malicious attacks. Many authentication solutions seek to protect the perimeters around stored data while others protect data at an operating system level or with dedicated appliances. Increasingly sophisticated hardware solutions have come to market, such as hardware encrypting storage drives, encrypting RAID controllers and encrypting chipsets. One difficulty with these solutions is that datacenter topologies typically store secrets and credentials to protect data on the platform that stores the data, in which case having access to the physical position of the platform renders the security steps largely useless. Another difficulty is that rouge systems that have been successfully attacked a datacenter can boot onto a controlled network, thus putting the network at risk.

To avoid infiltration by malicious software, industry has developed a number of physical systems that are protected from access by external software, such as software communicated through a network. For example, a Trusted Platform Module (TPM) uses a special purpose service processor integrated in an information handling system's chipset to protect the boot process of the information handling system. A service processor is essentially a secondary information handling system integrated within a primary information handling system used for management of the primary information handling system, such as performing monitoring, configuration and update functions. The service processors perform system management functions, such as coordination of remote power-up and power-down events through an out-of-band network interface. For example, service processors are baseboard management controllers (BMC), integrated management controllers (IMC), an integrated Dell Remote Access controller (DRAC) or Active Management Technology (AMT). In addition to these physical techniques, corporate networks also use third party authentication services to provide authentication for computer systems within a domain. A user provides credentials to the information handling system that the user is attempting to access. The credentials are provided to a third party authentication service to authenticate the access from a centralized database of identities rather than a local identity. Absent authentication, the end user is not allowed access to the information handling system.

SUMMARY OF THE INVENTION

Therefore a need has arisen for a system and method which protects information handling systems at boot even where physical access to the system is compromised, such as by theft or malicious software.

In accordance with the present invention, a system and method are provided which substantially reduce the disadvantages and problems associated with previous methods and systems for securing information handling systems. Boot of an operating system at an information handling system is locked from further continuation pending authentication through an authentication service. A service processor that manages components of the information handling system obtains authentication of the information handling system itself to authorize boot.

More specifically, an information handling system is built from plural components that cooperate to process information. A service processor manages operation of the processing components, such as a baseboard management controller in a server information handling system and or proprietary systems like Active Management Technology in a client system. A boot authorization module activates at power up of the information handling system and before boot of an operating system to lock boot of the operating system until authorized. The boot authorization module interfaces through a network, such as the Internet, with a pre-configured authentication service, such as a remoter server from the domain of the information handling system. The boot authorization module provides authentication information to the authentication service, such as a unique identification code for the service processor or the information handling system, to establish authentication. The authentication service authorizes boot by release of a token, such as a token stored locally at the service processor or by communication of a token from the authentication service to the service processor. The service processor applies the token to unblock boot of the information handling system.

The present invention provides a number of important technical advantages. One example of an important technical advantage is that a manageable, flexible and scalable architecture offers security through compatible systems in a heterogeneous datacenter environment. Security is maintained regardless of the physical location of an information handling system by requiring remote authentication at boot of the system. Malicious actions by rouge systems already successfully attacked are restricted by protecting against attempted boots by the rouge systems onto a controlled network, similar to protection provided by Network Access Control functionality. In addition, information stored on an information handling system that is physically stolen remains protected by preventing boot of the information handling system absent third party authentication.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Boot of an operating system at an information handling system is locked unless a service processor of the information handling system authorizes boot by obtaining a token from a third party authentication. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
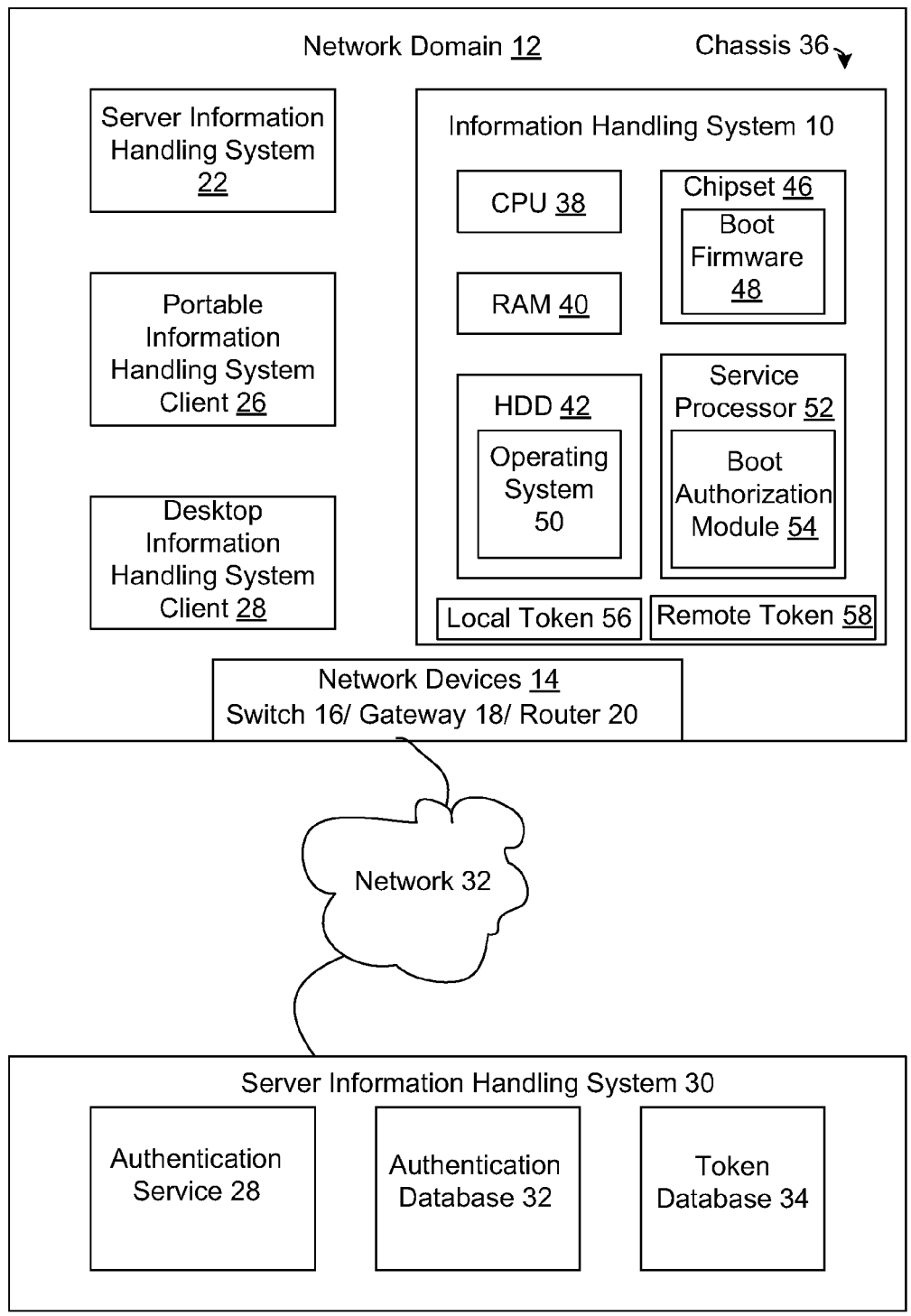
FIG. 1 depicts a block diagram of an information handling system having a secure boot through third party authentication.

Referring now to FIG. 1, a block diagram depicts an information handling system 10 having a secure boot through third party authentication. Information handling system 10 is disposed in a network domain 12 with other information handling systems, such as based upon network addresses managed by network devices 14, like a switch 16, a gateway 18 or a router 20. Information handling systems in domain 12 include server information handling systems 22, desktop information handling system 24 and portable information handling systems 26, each of which in the example embodiment of FIG. 1 have a service processor that supports authentication as set forth herein. Authentication of each information handling system in domain 12 is accomplished with an authentication service 28, such as a remote server information handling system 30 that communicates with domain 12 through a network 32, such as the Internet. Authentication service 28 has an authentication database 32 that associates authentication information of information handling systems within domain 12 with authorization for the information handling systems to boot. A token database 34 stores authentication tokens that may be sent to information handling systems for use as authorization for boot. In one alternative embodiment, tokens are provided by a token service separate from authorization service 28.

Information handling system 10 within domain 12 has a secure boot by obtaining authorization for boot through authentication service 28. Information handling system 10 is build with plural processing components disposed in a chassis 36, such as a CPU 38, RAM 40, a hard disk drive 42, and a chipset 44 that cooperate to process information. During normal non-secure operations, information handling system 10 boots by executing boot firmware 48 stored in chipset 46 to bring an operating system 50 stored on hard disk drive 42 to an operational state on CPU 38. During such boot, boot firmware 48 communicates with service processor 52 using a variety of standard and non-standard bus communications, such as IPMI over KCS. Boot firmware 48 requests authorization to continue boot from service processor 52 through such communications channels. During secure operations, a service processor 52 locks chipset 46 from performing boot unless authentication is received from authentication service 28 and unlocks chipset 46 to allow boot once authentication is received. Service processor 52 manages operation of processing components within chassis 36, including power up and power down of the processing components. For example, service processor 52 is a baseboard management controller (BMC) that manages a server or an Active Management Technology based processor that manages a client.

In operation, a secure boot of information handling system 10 is accomplished by establishing secure communications between boot authorization module 54 executing on service processor 52 and authentication service 28, such as with Lightweight Directory Access Protocol (LDAP) over Transport Security Layer (TSL). In one embodiment, boot authorization module 54 connects to service 28 and verifies that authentication service 28 belongs to network domain 12 through the use of authentication information, such as X509 certificates and OpenSSL libraries. If the verification succeeds, authentication service 28 sends a success message to boot authorization module 54, which allows service processor 52 to unlock the boot of operating system 50. In another embodiment, in addition to verification of authentication service as described above, boot authorization module 54 provides authentication information to authentication service 28, such as an identifier that is unique to service processor 25 or information handling system 10. If the authentication information matches that of authentication database 32, authentication service 28 sends a success message to boot authorization module 54, which allows service processor 52 to unlock boot of operating system 50. In one embodiment, boot authorization module 54 unlocks boot by releasing a locally-stored token 56. In an alternative embodiment, boot authorization module 54 queries authentication service 28 for a token from token database 34 and then unlocks boot with the remotely-stored token 58 provided from authentication service 28. In one alternative embodiment, boot authorization module 54 queries a token management service for a token and then unlocks boot with a remotely-stored token provided from the token management service.

Figure 2:
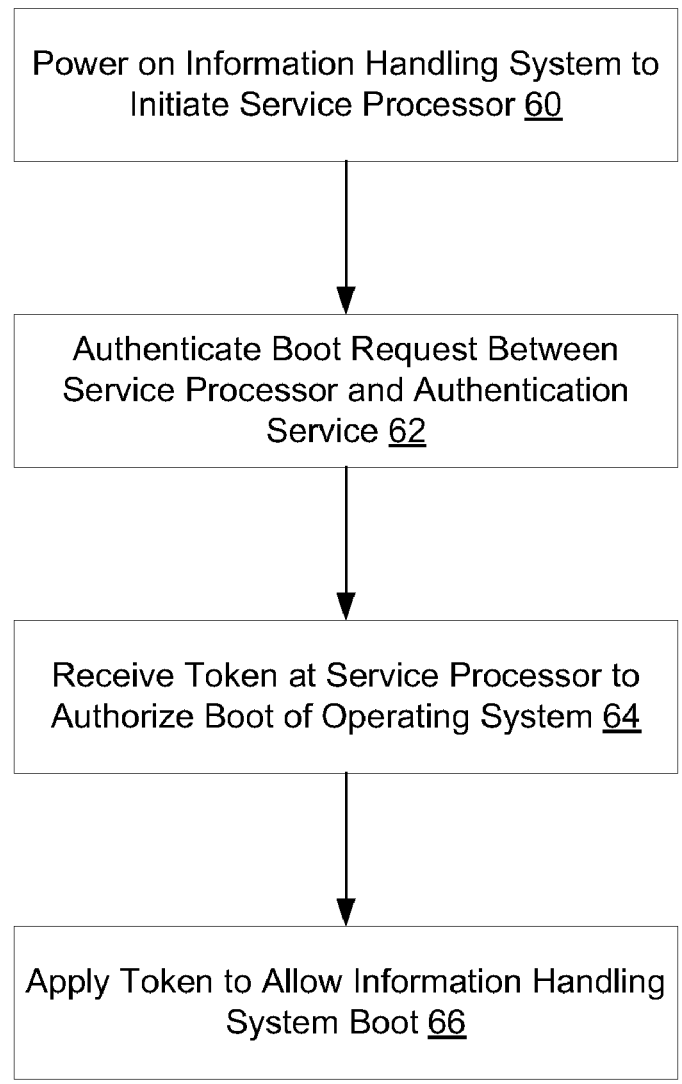
FIG. 2 depicts a flow diagram of a process for securing a boot with third party authentication.

Referring now to FIG. 2, a flow diagram depicts a process for securing a boot with third party authentication. The process begins at step 60 with application of power to a service processor of the information handling system. At step 62, the service processor initiates contact with a third party authentication service, such as by contacting a remote server. For example, the service processor attempts to establish a mutual authentication through a Transport Security Layer. At step 64, a token that the service processor applies to unlock boot is made available if authentication is successful. In one embodiment, the token is locally stored at the service processor location and released upon authentication. In an alternative embodiment, the token is downloaded by the service processor from the remote service. At step 66, the service processor applies the token to allow boot of the operating system at the information handling system. The token is, for instance, a one time authorization to boot so that each boot attempt requires a new token obtained by authentication.

Although the present invention has been described in detail, it should be understood that various changes, substitutions and alterations can be made hereto without departing from the spirit and scope of the invention as defined by the appended claims.

What is claimed is:

1. An information handling system comprising:
a chassis;
plural components disposed in the chassis and operable to cooperate to process information under an operating system;
boot firmware stored on a processing component, the boot firmware operable to boot the operating system;
a service processor disposed in the chassis and interfaced with the boot firmware, the service processor operable to lock and unlock boot of the operating system; and
a boot authorization module operable to execute on the service processor, the boot authorization module operable at power-on of the service processor to query an authentication service through a network for authorization to boot the operating system and to unlock boot of the operating system if authorization is received from the authentication service;
wherein a determination of authorization to boot the operating system is made at the authentication service and communicated through the network to the boot authorization module.

2. The information handling system of claim 1 wherein the boot authorization module is further operable to unlock boot with a locally-stored token.

3. The information handling system of claim 1 wherein the boot authorization module retrieves a token from the authentication service as authorization to boot.

4. The information handling system of claim 3 wherein the boot authorization module unlocks boot with the token.

5. The information handling system of claim 1 wherein the boot authorization module queries the authentication service through a Transport Security Layer.

6. The information handling system of claim 1 wherein the service processor comprises a baseboard management controller.

7. The information handling system of claim 1 wherein the boot authorization module queries the authentication server through the Internet.

8. A method for securing an information handling system, the method comprising:
applying power to a service processor of the information handling system;
establishing an authentication between the service processor and an authentication server through a network;
determining a successful authentication at the authentication server;
communicating the successful authentication from the authentication server to the service processor; and
in response to the communicating, allowing with the service processor a boot of an operating system at the information handling system if an authentication is established.

9. The method of claim 8 wherein the service processor comprises a baseboard management controller.

10. The method of claim 8 wherein the service processor comprises a chipset.

11. The method of claim 8 wherein establishing an authentication further comprises:
sending authentication information from the service processor to the authentication server; and
unlocking the information handling system to allow boot upon return of authentication information from the authentication server.

12. The method of claim 8 wherein establishing an authentication further comprises:
providing an authentication token from the authentication server to the service processor; and
applying the token by the service processor to unlock boot of the information handling system.

13. The method of claim 8 wherein establishing an authentication further comprises communicating through a Transport Security Layer.

14. The method of claim 8 wherein the information handling system comprises a server information handling system.

15. The method of claim 8 wherein the information handling system comprises a portable information handling system.

16. A system for secure boot of an information handling system operating system, the system comprising:
a service processor integrated with the information handling system and operable to manage information handling system functions with processing components of the information handling system powered down; and
a boot authorization module executing on the service processor and operable to communicate through a network with a remote authorization service to obtain authorization for boot of the operating system, to lock boot of the operating system unless authorization is obtained, and to unlock boot of the operating system if authorization is received.

17. The system of claim 16 wherein the boot authorization module unlocks boot of the operating system by release of a locally-stored token.

18. The system of claim 16 wherein the boot authorization module unlocks boot of the operating system by retrieving a token from a token service and applying the token to unlock boot.

19. The system of claim 16 wherein the boot authorization module communicates with the authentication service through a Transport Security Layer.

20. The system of claim 16 wherein the service processor comprises a baseboard management controller.

* * * * *